United States Patent
Chan et al.

(10) Patent No.: US 7,099,966 B2
(45) Date of Patent: Aug. 29, 2006

(54) POINT-TO-POINT ELECTRICAL LOADING FOR A MULTI-DROP BUS

(75) Inventors: Michael Y. Chan, Houston, TX (US); Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 910 days.

(21) Appl. No.: 10/184,164

(22) Filed: Jun. 28, 2002

(65) Prior Publication Data

US 2004/0003162 A1    Jan. 1, 2004

(51) Int. Cl.
*G06F 13/00* (2006.01)

(52) U.S. Cl. ............ 710/100; 710/306; 710/302; 710/305

(58) Field of Classification Search ......... 710/305, 710/301–304, 105, 316, 100, 306
See application file for complete search history.

(56) References Cited

U.S. PATENT DOCUMENTS

| | | | |
|---|---|---|---|
| 6,185,642 B1 * | 2/2001 | Beukema et al. ............ 710/60 |
| 6,263,394 B1 * | 7/2001 | Inagawa et al. ............ 710/312 |
| 6,266,731 B1 | 7/2001 | Riley et al. | |
| 6,363,452 B1 * | 3/2002 | Lach .......................... 710/316 |
| 6,519,669 B1 * | 2/2003 | Yanagisawa ............... 710/304 |
| 6,557,068 B1 | 4/2003 | Riley et al. | |
| 6,799,238 B1 * | 9/2004 | Miller ........................ 710/302 |
| 6,813,671 B1 * | 11/2004 | Ikeda ......................... 710/303 |

\* cited by examiner

*Primary Examiner*—Rehana Perveen
*Assistant Examiner*—Kim T. Huynh

(57) ABSTRACT

A switching technique allows multiple interconnect bus devices to be connected to a single bus segment, even if the interconnect bus protocol only allows a one of the interconnect devices to be connected at any time. Each of the interconnect devices is connected to the interconnect bus segment with a switch, such that the interconnect device is electrically isolated from the interconnect bus segment when the switch is open. An interconnect sourcing agent connected to the interconnect bus segment controls the switches, closing the switch for one of the interconnect devices when a transaction is destined for that interconnect device, opening all of the other switches so that only one device is connected to the bus at any time.

40 Claims, 8 Drawing Sheets

| Host | Device#1 | Device#2 | Function |
|---|---|---|---|
| EN3 | EN1 | EN2 | |
| 1 | 1 | 0 | Host ←→ Device#1 |
| 1 | 0 | 1 | Host ←→ Device#2 |
| 0 | 1 | 1 | Device#1 ←→ Device#2 |
| 1 | 1 | 1 | Bus enable |

| | T1 | T2 | Function |
|---|---|---|---|
| 1040 → | 1 | 0 | Terminate D1 |
| 1050 → | 0 | 1 | Terminate D2 |
| 1060 → | 0 | 0 | Tristate D1 & D2 |
| 1070 → | 1 | 1 | Terminate D1 & D2 |

POINT-TO-POINT ELECTRICAL LOADING FOR A MULTI-DROP BUS

CROSS-REFERENCE TO RELATED APPLICATIONS

This application is related to the following commonly owned U.S. patents and patent applications, which are hereby incorporated in their entirety by reference for all purposes:

U.S. Pat. No. 6,266,731, entitled "HIGH SPEED PERIPHERAL INTERCONNECT APPARATUS, METHOD AND SYSTEM," by Dwight Riley and Christopher J. Pettey; and U.S. patent application Ser. No. 09/747,422, now U.S. Pat. No. 6,557,068, entitled "HIGH SPEED PERIPHERAL INTERCONNECT APPARATUS, METHOD AND SYSTEM," by Dwight Riley and Christopher J. Pettey, filed Dec. 22, 2000.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention is related to interconnect busses of computer systems and in particular to dynamically connecting multiple devices to an interconnect bus such that only a single one of the multiple devices is connected to the interconnect bus at any time.

2. Description of the Related Art

Many computer systems use interconnect busses for multiple types of traffic. In addition, other embedded digital systems use interconnect busses for connecting devices in the embedded digital system.

Typical interconnect busses that share a common clock will naturally experience a reduction in electrical loading, a restriction in layout, or both as the shared common clock frequency increases. Fewer numbers of faster devices than slower devices can be connected to a given bus segment. For example, an interconnect bus running according to the PCI-X specification can support four devices running at 66 MHz, two at 100 MHz, and only a single device running at 133 MHz on any given bus segment.

Such a limitation may impose costs on system designers. Servers and other computer systems typically have a number of slots for interconnect devices. Limiting a bus segment to a single interconnect device means that each slot typically has its own sourcing bridge/host bridge per slot, increasing total system costs. In addition, the requirement for multiple bridges imposes additional space costs. Allowing a system designer an option to increase the electrical loading on a bus segment without adversely affecting performance, such as slowing device speeds, thereby reducing bandwidth, would be desirable.

BRIEF SUMMARY OF THE INVENTION

A disclosed technique allows connecting multiple interconnect devices to a single interconnect bus segment. An interconnect sourcing device is connected to the interconnect bus segment. The interconnect sourcing device is implemented according to an interconnect bus protocol. The technique electrically connects to the interconnect bus segment one interconnect device of a first interconnect device and a second interconnect device responsive to each interconnect transaction destined for the one interconnect device. The technique further electrically isolates from the interconnect bus segment the other interconnect device of the first interconnect device and the second interconnect device responsive to the interconnect transaction.

In one embodiment, the first interconnect device and the second interconnect device cannot simultaneously be electrically connected to the interconnect bus according to the interconnect protocol.

In one embodiment, the one interconnect device is electrically connected to the interconnect bus segment by closing a first switch interposed between the interconnect bus segment and the one interconnect device, responsive to a signal from the interconnect sourcing device and opening a second switch interposed between the interconnect sourcing device and the other interconnect device, responsive to a signal from the interconnect sourcing device.

In a further embodiment, the first switch and the second switch are packaged together as a unit. In another further embodiment, the first switch and the second switch are Field Effect Transistor (FET) switches.

In one embodiment, the interconnect protocol is the Peripheral Component Interconnect protocol.

In another embodiment, a first output line of the interconnect sourcing device is connected to a first switch electrically interposed between the interconnect bus segment and the first interconnect device and a second output line of the interconnect sourcing device is connected to a second switch electrically interposed between the interconnect bus segment and the second interconnect device. If the interconnect transaction is destined for the first interconnect device, a signal is sent on the first output line to close the first switch and if the interconnect transaction is destined for the second interconnect device, a signal is sent on the second output line to close the second switch. If the interconnect transaction is destined for the first interconnect device, a signal is sent on the second output line to open the second switch and if the interconnect transaction is destined for the second interconnect device, a signal is sent on the first output line to open the first switch.

In a further embodiment, the interconnect sourcing device is configured for hot-plug insertion and removal of the first interconnect device. A signal is sent on the first output line to open the first switch prior to a hot-plug insertion or removal of the first interconnect device and a signal is sent on the first output line to close the first switch after successful hot-plug insertion or removal of the first interconnect device. The interconnect sourcing device is also configured for hot-plug insertion and removal of the second interconnect device. A signal is sent on the second output line to open the second switch prior to a hot-plug insertion or removal of the second interconnect device. A signal is sent on the second output line to close the second switch after successful hot-plug insertion or removal of the second interconnect device.

In another embodiment, both the first interconnect device and the second interconnect device can be electrically isolated from the interconnect bus segment. In a further embodiment, a third output line of the interconnect sourcing device is connected to a third switch electrically interposed between the interconnect bus segment and both the first interconnect device and the second interconnect device. A signal can be sent on the third output line to open the first switch.

In one embodiment, the interconnect sourcing device is an interconnect bridge.

In another embodiment, the interconnect sourcing device includes firmware for controlling the switches used to electrically isolate the interconnect devices.

In another embodiment, the bus segment can be terminated between each of the interconnect devices and the interconnect sourcing device.

In yet another embodiment, each of the terminated signal lines of an interconnect bus can place an I/O buffer of the interconnect bus in a low-power state by turning off its terminators.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

The present invention provides a technique for enhancing the operation of computer system busses that use the extensions to the Peripheral Component Interconnect specification (hereinafter PCI-X busses), as well as logic circuits and signal protocols thereof. For illustrative purposes, embodiments are described herein for computer systems using Intel Corporation microprocessor architectures and certain terms and references are specific to such processor platforms. PCI-X and the enhancements described herein, however, are hardware independent, and may be used with any host computer designed for this interconnect standard. As will be appreciated by those skilled in the art of computer systems, the disclosed embodiments can be adapted and applied to any computer platform utilizing the PCI-X standard. Further, although the following is described in terms of PCI-X busses, other bus architectures and protocols, such as the 3GIO bus architecture and protocol being promoted by Intel Corporation, Compaq Computer Corporation, Microsoft Corporation, IBM Corporation, and Dell Computer Corporation, could also be used.

Figure 1:
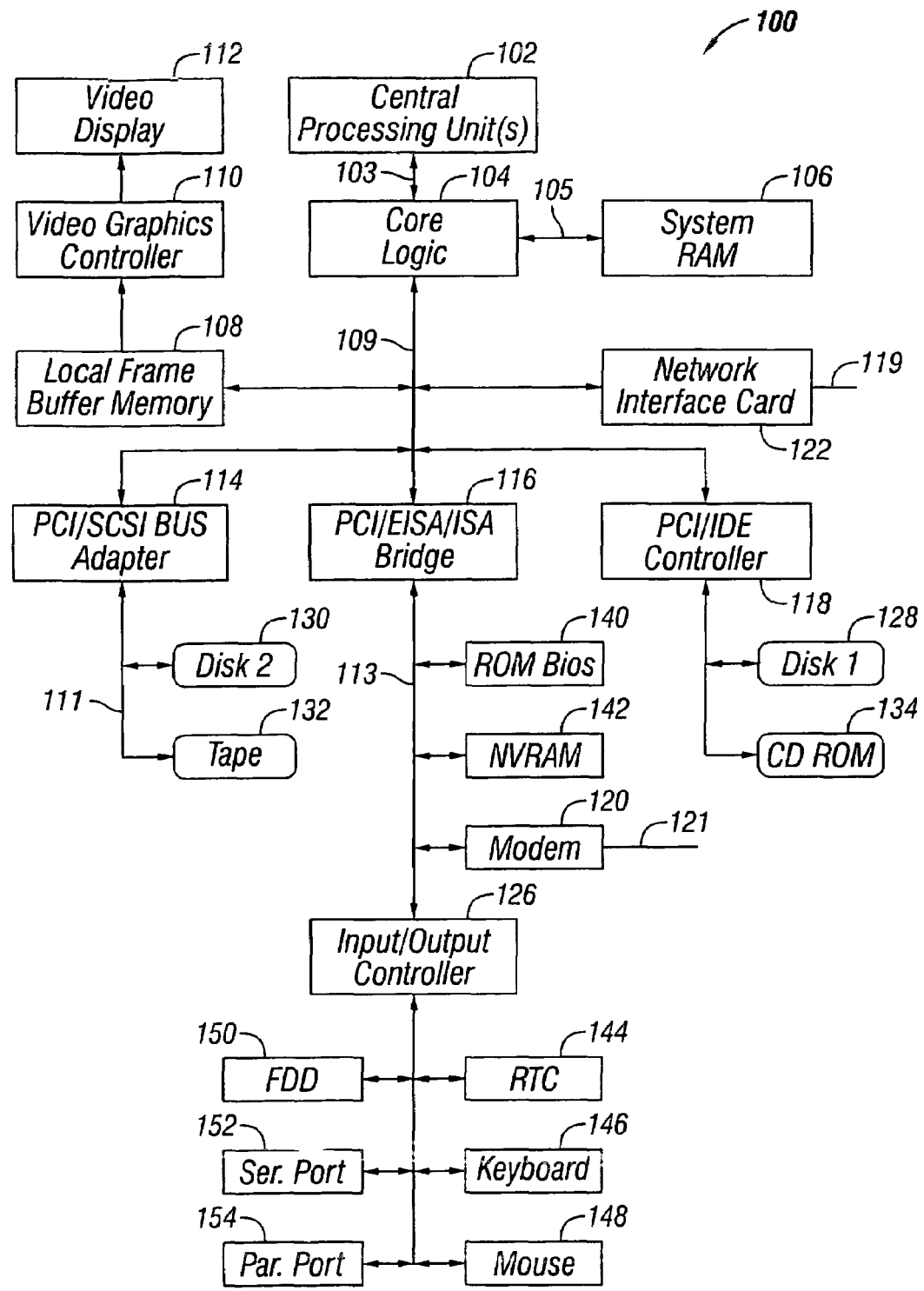
FIG. 1 is a schematic block diagram of a computer system in accordance with an embodiment of the invention.

Referring to FIG. 1, an exemplary schematic block diagram illustrates a computer system according to a disclosed embodiment. The computer system is generally indicated by the numeral 100 and comprises central processing unit(s) (CPU) 102, core logic 104, system random access memory (RAM) 106, a video graphics controller 110, a local frame buffer 108, a video display 112, a PCI/SCSI bus adapter 114, a PCI/EISA/ISA bridge 116, a PCI/IDE controller 118, and, optionally, a network interface card (NIC) 122. Single or multilevel cache memory (not illustrated) may also be included in the computer system 100 according to the current art of microprocessor computer systems. The CPU 102 may be a plurality of CPUs 102 in a symmetric or asymmetric multi-processor configuration.

The CPU 102 is connected to the core logic 104 through a CPU host bus 103. The system RAM 106 is connected to the core logic 104 through a memory bus 105. The core logic 104 includes a host-to-PCI bridge between the host bus 103, the memory bus 105 and a PCI-X bus 109. More than one PCI-X bus is contemplated herein as well as PCI-X-to-PCI-X bridges (not illustrated), and is within the scope and intent of the present invention. The local frame buffer 108 is connected between the video graphics controller 110 and the PCI-X bus 109. The PCI/SCSI bus adapter 114, PCI/EISA/ISA bridge 116, PCI/IDE controller 118 and the NIC 122 are connected to the PCI-X bus 109. Some of the PCI-X devices such as the video controller 110 and NIC 122 may plug into PCI connectors on the computer system 100 motherboard (FIG. 2).

Hard disk 130 and tape drive 132 are connected to the PCI-X/SCSI bus adapter 114 through a SCSI bus 111. The NIC 122 may be connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive (FDD) 150, serial port 152, and parallel port 154. The EISA/ISA bus 113 is a slower information bus than the PCI-X bus 109 with lower interface costs. The devices shown in FIG. 1 are exemplary and illustrative only, and other computer system configurations could be used. Further, disclosed embodiments can be implemented in embedded systems other than conventional computer systems.

When the computer system 100 is first turned on, start-up information stored in the ROM BIOS 140 is used to begin operation thereof. Basic setup (BIOS) instructions are stored in the ROM BIOS 140 so that the computer system 100 can load more complex operating system (OS) software from a memory storage device, such as the disk 130. Before the operating system software can be loaded, however, certain hardware in the computer system 100 is configured to properly transfer information from the disk 130 to the CPU 102. In the computer system 100 illustrated in FIG. 1, the PCI/SCSI bus adapter 114 is configured to respond to commands from the CPU 102 over the PCI-X bus 109 and transfer information from the disk 130 to the CPU 102 via busses 109 and 103. The PCI/SCSI bus adapter 114 is a PCI-X device and remains platform independent. Therefore, separate hardware independent commands are used to setup and control any PCI-X device in the computer system 100. These hardware independent commands, however, are located in PCI-X BIOS contained in the computer system ROM BIOS 140. The PCI-X BIOS is firmware that is hardware specific but meets the general PCI Local Bus Specification, Revision 2.2 (the PCI specification) together with the general PCI-X Addendum to the PCI Local Bus Specification 1.0 (the PCI-X specification), both of which are incorporated by reference herein in their entirety. Plug and play and PCI devices (both PCI and PCI-X) in the computer system are detected and configured when a system configuration program is executed. The results of the plug and play and PCI-X device configurations are stored in the NVRAM 142 for later use by the startup programs in the ROM BIOS 140 and the PCI-X BIOS that configure the necessary computer system 100 devices during startup. Also during startup a "built-in-self-test" (BIST) may do diagnostic testing of components, such as PCI-X devices, in the computer system.

Figure 2:
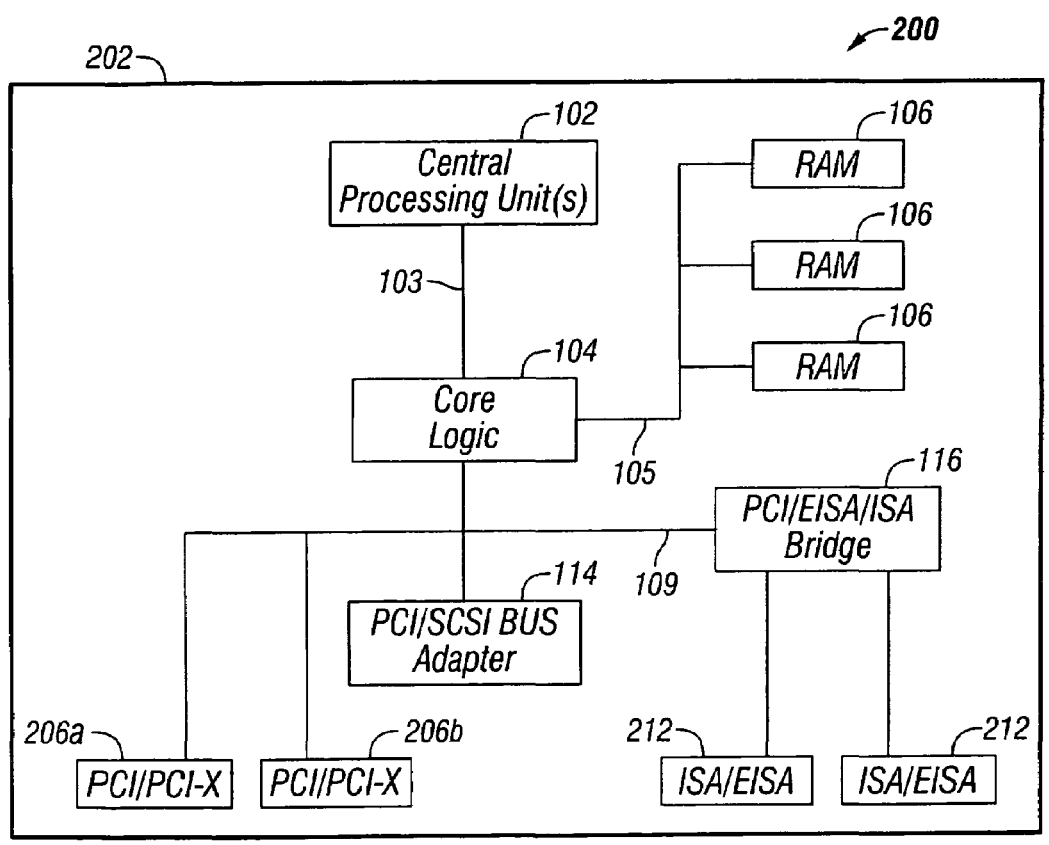
FIG. 2 is a schematic diagram of a printed circuit motherboard of the computer system of FIG. 1.

Referring to FIG. 2, a schematic diagram of an exemplary computer system motherboard according to FIG. 1 is illustrated. The computer system motherboard 200 comprises printed circuit board 202, on which components and connectors are mounted thereto. The printed circuit board 202 comprises conductive printed wiring used to interconnect the components and connectors thereon. The conductive printed wiring (illustrated as busses 103, 105 and 109) may be arranged into signal busses having controlled impedance characteristics. Illustrated on the printed circuit board are the core logic 104, CPU(s) 102, RAM 106, embedded PCI/ISA/EISA bridge 116, ISA/EISA connectors 212, embedded PCI/SCSI bus adapter 114, and PCI/PCI-X connectors 206a, 206b (connectors are the same for PCI and PCI-X). The motherboard 200 may be assembled into a case with a power supply, disk drives, etc. (not illustrated), which comprise the computer system 100 of FIG. 1. The motherboard of FIG. 2 is exemplary and illustrative only and other motherboards and other configurations and arrangement of components can be used, including embedded systems and other than conventional computer systems.

Figure 3:
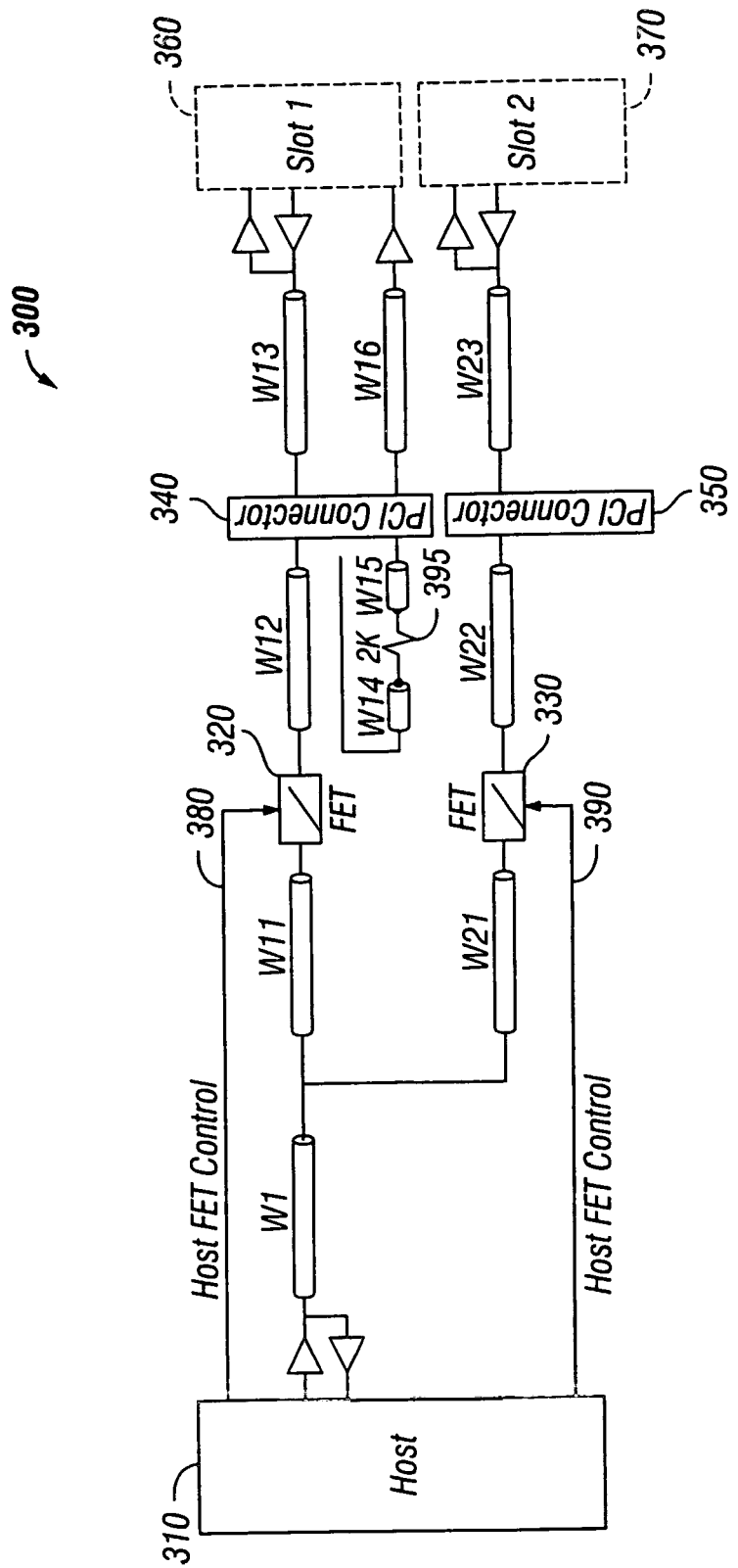
FIG. 3 is a block diagram of an interconnect bus segment according to one embodiment.

Turning to FIG. 3, a conventional multidrop PCI bus segment 300 is shown. The bus segment 300 is shown configured for hot-plug insertion and removal of PCI devices 360 and 370 in slots 1 and 2. Devices 360 and 370 are typical PCI or PCI-X devices and are not otherwise discussed. Wires W1–W23 are traces on a circuit board connecting the various components. Although the PCI bus segment 300 contains multiple signal lines such as AD# and C/BE# signal lines, only a single AD# signal line is shown in FIG. 3 for clarity purposes. Wherever a switch is discussed below, it should be understood that multiple switches are to be used, one for each bus segment signal line.

As shown in FIG. 3, PCI devices 360 and 370 are connected in the typical manner in Slots 1 and 2 through PCI Connectors 340 and 350. As provided for in the PCI Specification, resistor 395 can optionally be used for overloading an AD# signal by using resistive coupling instead of a separate ID Select signal line. Again, this resistive coupling technique is conventionally used and is not further discussed herein.

Switches 320 and 330 are conventional FET switches, conventionally used for hot-plug insertion and removal of PCI devices 360 and 370. As used for hot-plug insertion or removal, the switch 320 or the switch 330 is placed in an open position to electrically isolate the device 360 or 370 being inserted or removed, then placed back in a closed position when the insertion is completed. The switches 320 or 330 can optionally be closed when the removal is complete.

As shown in FIG. 3, switches 320 and 330 are controlled by signals on output control signal lines 380 and 390 from host 310. Host 310 is typically a host-to-PCI bridge or a PCI-to-PCI bridge, but can be any other type of sourcing device available. The host 310 is informed of the need to open or close switches 320 or 330 for hot-plug insertion or removal by some external technique, such as a control panel button pushed by an operator, not further identified herein. A signal on control signal line 380 or 390 is transmitted to switches 320 or 330 from the host 310 to cause a change in position of the switch responsive to the external technique.

Figure 4:
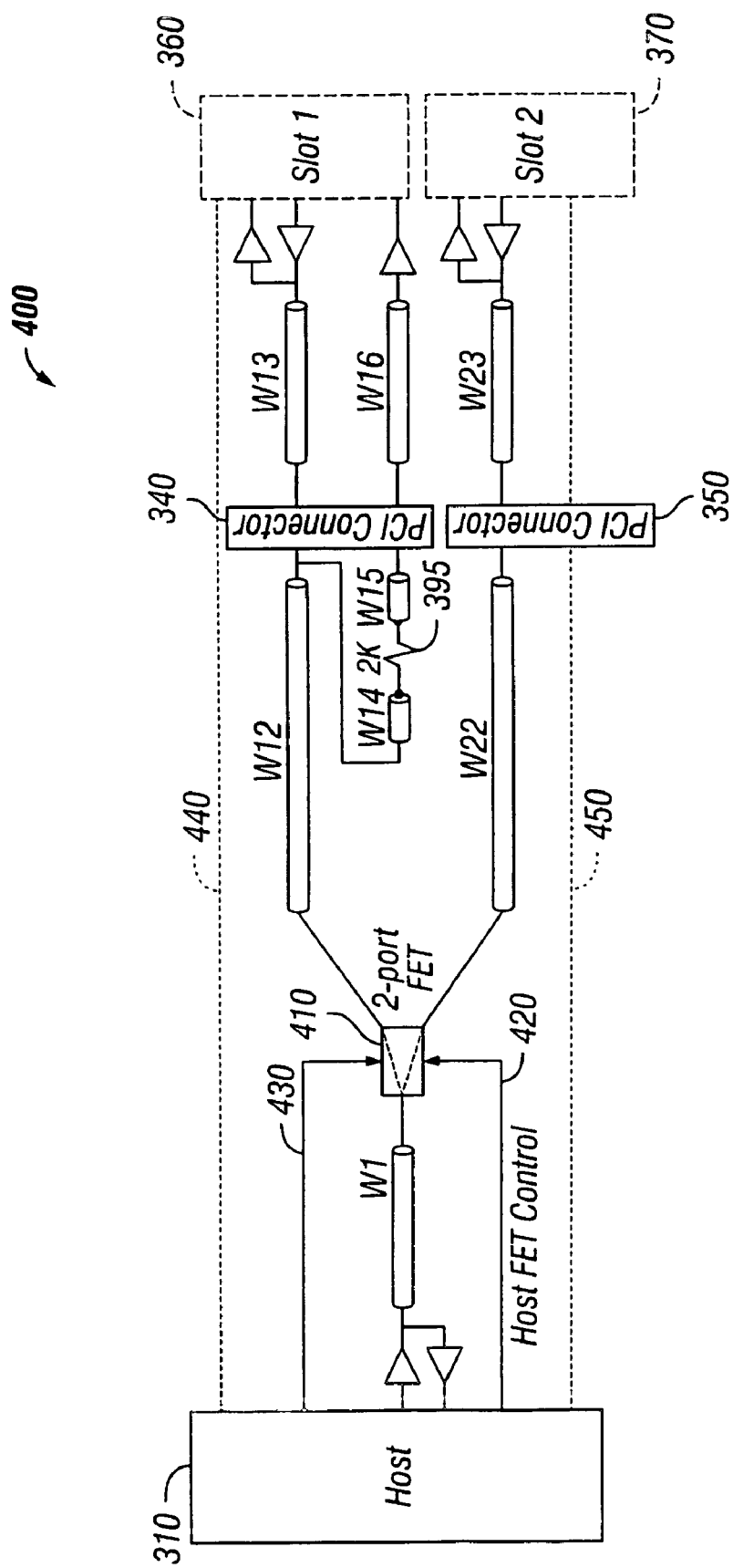
FIG. 4 is a block diagram of an interconnect bus segment according to another embodiment.

Turning to FIG. 4, bus segment 400 shows using a single 2-port FET switch 410, which packages the two FET switches together as a unit, instead of separate switches 320 and 330 as in FIG. 3. Such a multiport switch is commonly used for cost and space saving reasons, but otherwise behaves identically to the separate switches. All other elements of FIG. 4 are unchanged from FIG. 3.

Figures 5, 6:
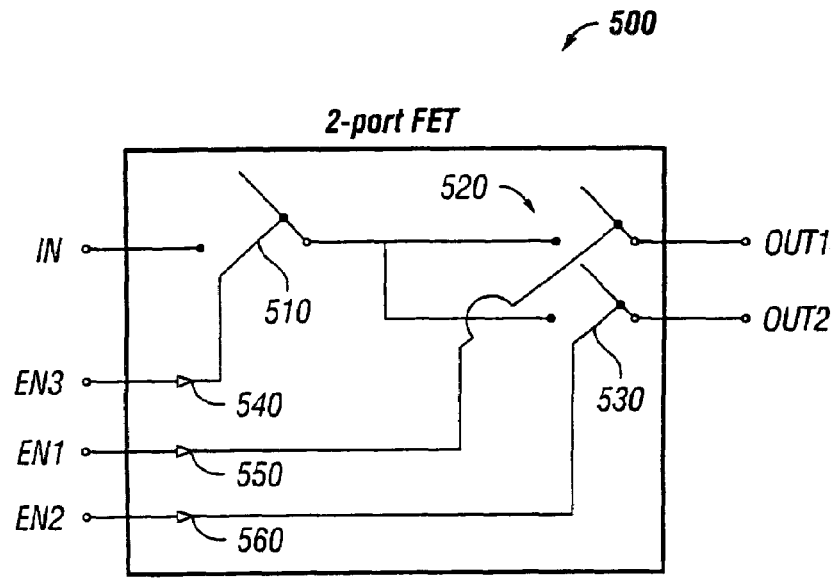
FIG. 5 is a block diagram of a multiport switch according to one embodiment.
FIG. 6 is a table of input signal values and switch settings for the switch of FIG. 5.

FIG. 5 illustrates a typical 2-port FET switch 500, such as the switch 410 of FIG. 4. As shown in FIG. 5, an input IN is connected to outputs OUT1 and OUT2 by way of switches 510–530. Each of the switches 510–530 is controlled by a control signal input EN1–EN3, respectively. When switch 510 is open, both outputs OUT1 and OUT2 are electrically isolated from input IN. When switch 510 is closed, input IN is connectable to outputs OUT1 and OUT2, depending on the position of switches 520–530. Control signal input EN1 controls the position of switch 520, while control signal input EN2 controls the position of switch 530. When in the closed position, switches 520–530 electrically connect the outputs OUT1–OUT2 to input IN. When switches 520–530 are in the open position, outputs OUT1 and OUT2 are electrically isolated from input IN. Although as shown in FIG. 5, control signal inputs EN1–EN3 are inverted by inverters 540–560, inverters 540–560 can be omitted, by inverting the signal used on inputs EN1–EN3 to position the switches 510–530 for any given position. In the context of FIG. 4, control signal inputs EN1 and EN2 are connected to control signal lines 380 and 390, while output lines OUT1 and OUT2 are connected to traces W10 and W22 to electrically connect or isolate devices 360 and 370. Input line IN is connected to bus segment trace W1.

Shown in dotted lines in FIG. 4, control signal input EN3 of the switch 500; implemented as switch 410, can optionally be connected to a third output control signal line 420 of the host 310 to electrically isolate both outputs OUT1 and OUT2 from the bus segment connected to input IN, thus electrically isolating devices 360–370 when a signal is sent on control signal line 420 to open switch 410. The third output control signal line 420 can alternatively be connected to a separate switch (not shown) instead of input EN3 of the switch 410, where the separate switch is positioned between the sourcing device 310 and the switch 410, or between the sourcing device 310 and switches 320–330 as in FIG. 3, as desired by a system designer.

Although FIGS. 3–5 illustrate a multidrop bus segment with two devices in addition to the sourcing bridge 310, any number of devices can be connected to the bus segment 300 or 400 in a similar fashion, with additional switches, either separately packaged as in FIG. 3 or packaged as a unit as shown in FIGS. 4–5. The sourcing bridge 310 would also need additional output lines corresponding to lines 380 and 510 for the additional devices.

FIG. 6 is a table showing the effect of sending control signals on lines EN1–EN3 as shown in FIGS. 4–5. Column 610 shows signals sent on control signal line 420 to input EN3 of the 2 port FET switch of FIG. 5 and switch 410 of FIG. 4, while columns 620 and 630 show signals sent on control signal lines 380 and 390 to inputs EN1 and EN2. Column 640 shows the effect of such signals. Row 650 shows a combination of signals that connects bus segment 300 and sourcing device 310 to device 360 and electrically isolates device 370. Row 660 shows a combination of signals that connects bus segment 300 and sourcing device 310 to device 370 and electrically isolates device 360. Row 670 shows a combination of signals that electrically connects device 360 to device 370, but electrically isolates both device 360 and device 370 from bus segment 300 and sourcing device 310. Finally, row 680 shows a combination of signals that connects the bus segment 300 and sourcing device 310 to both devices 360 and 370, forming a fully multi-dropped bus segment 300.

The hardware of FIGS. 3–6 have been implemented in computer systems and components manufactured by Compaq Computer Corporation for providing hot-plug insertion and removal of devices. However, in these computer systems and components, the interconnect bus is configured as a multi-drop interconnect bus segment, or if necessary because of the PCI-X specification, an interconnect bus with a single slot for connecting a single relatively fast device.

In a disclosed embodiment, the existing hot-plug-capable hardware of FIGS. 3–6 can be used to create a point-to-point interconnect bus, dynamically connecting or isolating devices 360 and 370 to and from the bus segment. Additionally, a bus segment constructed without the switches 320–330 or 410 or control signal lines 380–390 can add such switches and control signal to form this embodiment. In this embodiment, sourcing device 310 can signal switches 320–330 or multiport switch 410, opening and closing the switches responsive to transactions destined for one or the other of devices 360–370, by signaling the switches using control signal lines 380–390. In this embodiment, a single sourcing bridge can create a multidrop bus segment while retaining the electrical loading characteristics of two point-to-point bus segments that would otherwise require additional sourcing bridges to retain compatibility with the PCI-X specification. By using the existing hot-plug hardware, this embodiment can be created with little or no additional hardware cost. Firmware in the sourcing bridge 310 would be modified or added to control the switch 410 or switches 320–330.

Figure 7:
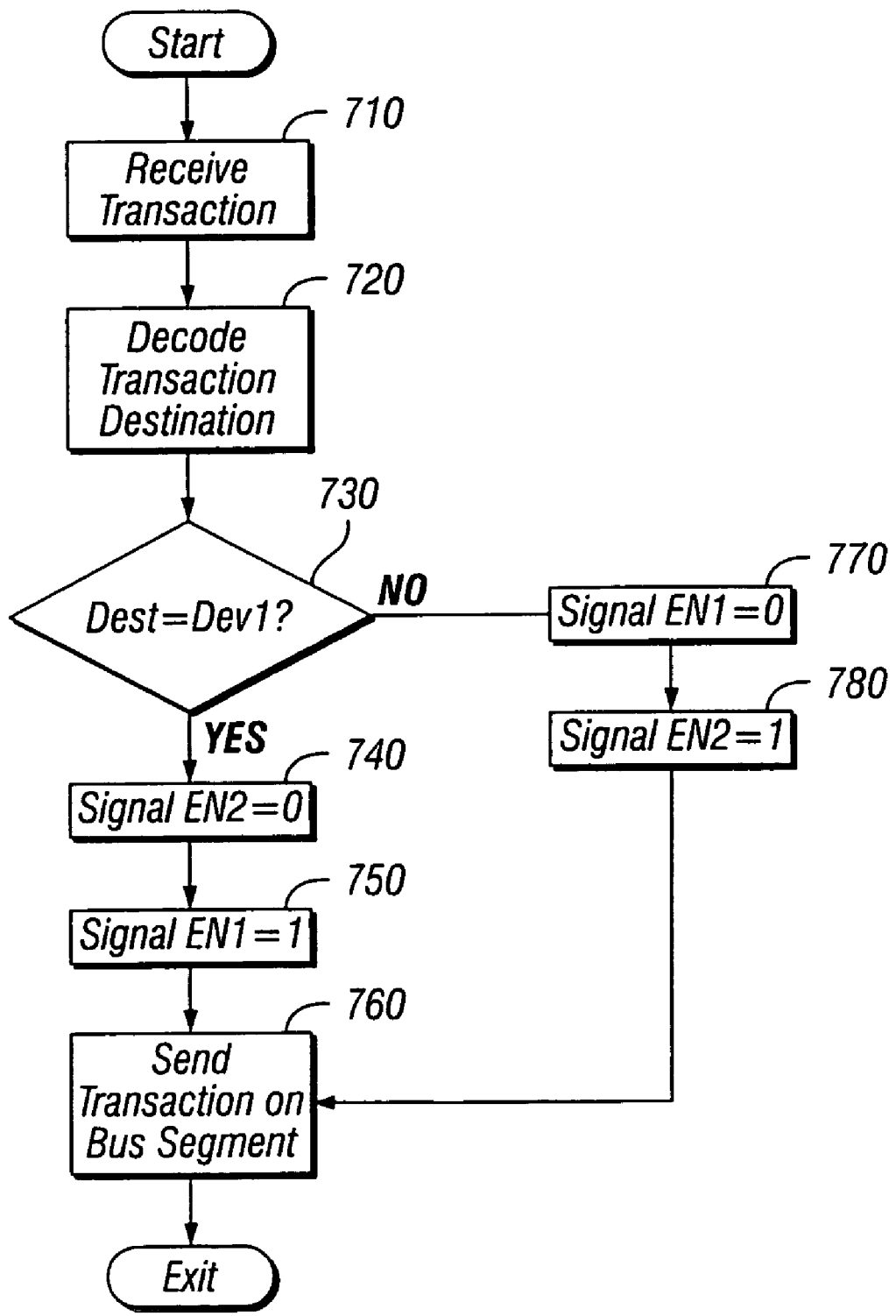
FIG. 7 is a flowchart of electrically connecting and electrically isolating interconnect devices on the bus segment of FIGS. 3 and 4 and the switch of FIG. 5.

FIG. 7 is a flow chart illustrating this technique. In step 710, sourcing bridge 310 receives a transaction destined for either device 360 or 370. In step 720, sourcing bridge 310 decodes the transaction. In step 730, sourcing bridge determines if the transaction is destined for device 360. If so, then the sourcing bridge electrically isolates device 370 by sending a zero or other similar signal on output control signal line 390 to input EN2 of the switch 410 in step 740. Then, in step 750, sourcing bridge 310 electronically connects device 360 by sending a 1 or similar signal to input EN1 of switch 410 on control signal line 380. Once device 360 is connected, sourcing bridge 310 can place the transaction on the bus segment for receipt by device 360.

If the transaction is destined for device 370, then in step 770 the sourcing bridge 310 sends a 0 or similar signal to input EN1 of the switch 410 across control signal line 380, electrically isolating device 360 from the bus segment. In step 780, device 370 is connected to the bus segment by sending a 1 to input EN2 using control signal line 390. Then in step 760, the transaction is placed on the bus segment for handling by device 370. By isolating one or the other of devices 360–370, this technique effectively creates point-to-point electrical loading for a multidrop bus.

As shown in FIG. 6, in a disclosed embodiment switch 410 can be placed in a condition to electrically isolate devices 360 and 370 from the rest of the bus segment and sourcing bridge 310, while staying connected with each other. Such a configuration would allow peer-to-peer transactions between devices 360 and 370. However, out-of-band signals 440 and 450 to the sourcing bridge, shown as dotted lines in FIG. 4, would be needed to allow devices 360 and 370 to indicate to sourcing bridge 310 to control switch 410 to form this peer-to-peer connection, which would need adding such out of band communication signaling capability to devices 360 and 370. In another embodiment a transaction would be initiated on or behind sourcing bridge 310 to request device 360 to send data to the sourcing bridge 310, which could then initiate a transaction to device 370, after reconfiguring switch 410.

Figure 8:
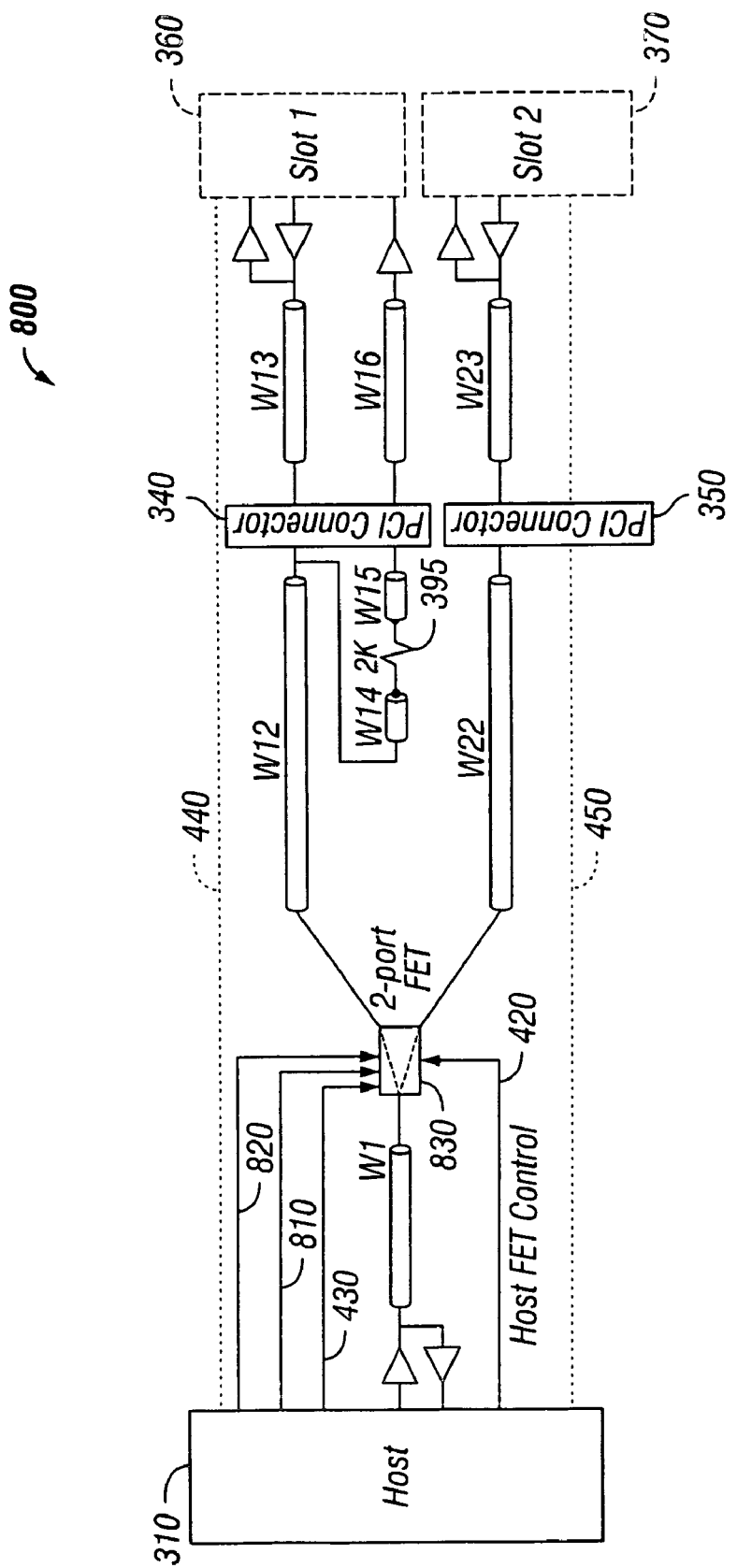
FIG. 8 is a block diagram of an interconnect bus segment according to yet another embodiment.

Turning to FIG. 8, yet another embodiment of a interconnect bus system is illustrated. In this embodiment, which can be an interconnect bus system implemented according to the PCI-X 2.0 standard, the interconnect bus segment is continuously driven. Terminators are used to terminate the interconnect bus segment 800, to avoid sinking excess current when one of the interconnect devices 360 or 370 is electrically disconnected from the interconnect bus segment. Switch 830, corresponding to switch 410 of FIG. 4, contains additional termination logic to selectively terminate the bus segment 800 between the sourcing device 310 and one or both of interconnect devices 360 and 370. An additional pair of control signal lines 810 and 820 allow the sourcing device 310 to signal the switch 830 to terminate the interconnect bus segment appropriately.

Figures 9, 10:
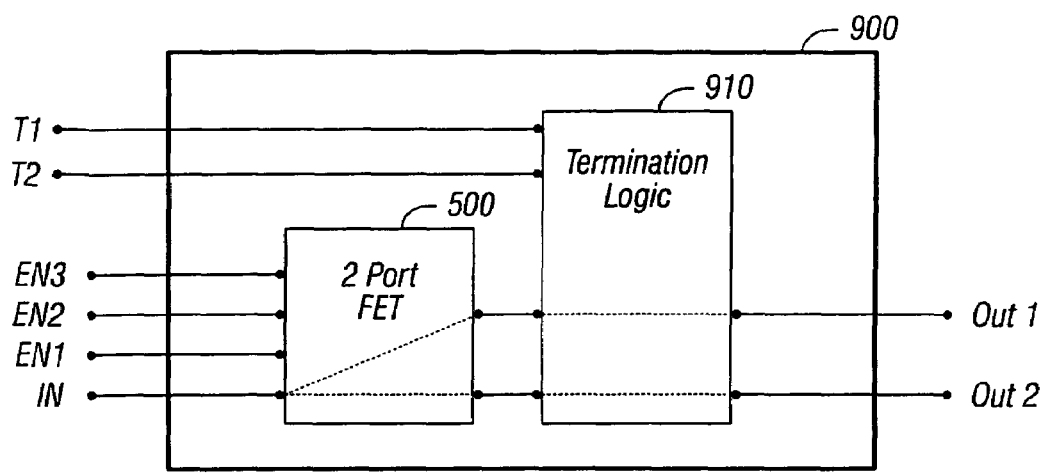
FIG. 9 is a block diagram of the multiport switch of FIG. 8.
FIG. 10 is a table of input signal values and switch settings for the switch of FIG. 9.

FIG. 9 is a block diagram illustrating one embodiment of the switch 830 of FIG. 8. The switch 900 is illustrative only, and other techniques can be used for selectively terminating the outputs of switch 900. Signal lines T1 and T2, corresponding to signal lines 810 and 820 of FIG. 8, provide signals from the sourcing device 310 to a termination logic 910. The two-port FET switch 500 corresponds to the switch of FIG. 5. Output lines OUT1 and OUT2 are connected via the termination logic 910 to the FET switch 500. The termination logic 910 can use any convenient technique for terminating the signals OUT1 and OUT2. One skilled in the art will understand that termination of interconnect busses is well known.

FIG. 10 is a table showing the effect of sending control signals on lines T1 and T2 as shown in FIGS. 8–9. Column 1010 shows signals sent on control signal line 810 to input T1 of the switch 810 of FIG. 8, while column 1020 shows signals sent on control signal line 820 to input T2. Column 1030 shows the effect of such signals. Row 1040 shows a combination of signals that terminate the bus segment 800 between sourcing device 310 and device 360 only. Row 1040 shows a combination of signals that terminate the bus segment 800 between sourcing device 310 and device 370 only. Row 1070 shows a combination of signals that terminate the bus segment 800 between sourcing device 310 and both devices 360 and 370. Finally, row 1060 shows a combination of signals that does not terminate the bus segment 800, allowing signals to tristate when one or both of interconnect devices 360 and 370 are electrically disconnected from the interconnect bus 800.

In another disclosed embodiment, instead of using termination logic as shown in FIGS. 8–10, each of the interconnect devices 360 and 370 can selectively place an I/O buffer into a low-power state. In this embodiment, a separate transaction is sent between the sourcing agent 310 and the interconnect device 360 or 370 across bus segment 400 as shown in FIG. 4 when the interconnect device 360 or 370 is to be electrically disconnected from the interconnect bus 400, to signal the interconnect device 360 or 370 to place the I/O buffer into a low power state. Other in-band techniques can be used. For example, the ARB/GNT signal line pairs of the interconnect bus segment 400 can be used to signal, via defined pulses, the interconnect bus segment 400 to enter or exit the low power state on terminated signal lines of the interconnect bus segment 400. Upon electrical reconnection to the interconnect bus 400 by switch 410, the interconnect device 360 or 370 can place the I/O buffer into a full-power state for continued operation, without the need for an additional signal from the sourcing device 310. In this embodiment, the switch 410 as illustrated in FIGS. 4–6 can be used without the need for the termination logic as shown in FIGS. 8–10.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

We claim:

1. A method for connecting interconnect devices to an interconnect bus segment, the method comprising the steps of:
connecting an interconnect sourcing device to the interconnect bus segment, the interconnect sourcing device implemented according to an interconnect bus protocol;
electrically connecting to the interconnect bus segment one interconnect device of a first interconnect device and a second interconnect device responsive to an interconnect transaction destined for the one interconnect device over the interconnect bus segment; and
electrically isolating from the interconnect bus segment another interconnect device of the first interconnect device and the second interconnect device responsive to the interconnect transaction.

2. The method of claim 1, wherein the first interconnect device and the second interconnect device are prohibited from being simultaneously electrically connected to the interconnect bus segment according to the interconnect bus protocol.

3. The method of claim 1,
the step of electrically connecting comprising the step of:
closing a first switch interposed between the interconnect bus segment and the one interconnect device, responsive to a signal from the interconnect sourcing device; and
the step of electrically isolating comprising the step of:
opening a second switch interposed between the interconnect bus segment and the other interconnect device, responsive to a signal from the interconnect sourcing device.

4. The method of claim 3, further comprising the step of:
packaging the first switch and the second switch together as a unit.

5. The method of claim 3, wherein the first switch and the second switch are Field Effect Transistor (FET) switches.

6. The method of claim 1, wherein the interconnect bus protocol is the Peripheral Component Interconnect protocol.

7. The method of claim 1, further comprising:
determining, by the interconnect sourcing device, if the interconnect transaction is destined to the first interconnect device or second interconnect device over the interconnect bus segment;
the step of connecting the interconnect sourcing device to the interconnect bus segment comprising the step of:
connecting a first output line of the interconnect sourcing device to a first switch electrically interposed between the interconnect bus segment and the first interconnect device; and
connecting a second output line of the interconnect sourcing device to a second switch electrically interposed between the interconnect bus segment and the second interconnect device;
the step of electrically connecting comprising the step of:
if the interconnect transaction is destined for the first interconnect device, the interconnect sourcing device sending a signal on the first output line to close the first switch; and
if the interconnect transaction is destined for the second interconnect device, the interconnect sourcing device sending a signal on the second output line to close the second switch;
the step of electrically isolating comprising the step of:
if the interconnect transaction is destined for the first interconnect device, the interconnect sourcing device sending a signal on the second output line to open the second switch; and
if the interconnect transaction is destined for the second interconnect device, the interconnect sourcing device sending a signal on the first output line to open the first switch.

8. The method of claim 7, further comprising the steps of:
configuring the interconnect sourcing device for hot-plug insertion and removal of the first interconnect device, comprising the steps of:
sending a signal on the first output line to open the first switch prior to a hot-plug insertion or removal of the first interconnect device; and
sending a signal on the first output line to close the first switch after successful hot-plug insertion or removal of the first interconnect device; and
configuring the interconnect sourcing device for hot-plug insertion and removal of the second interconnect device, comprising the steps of:
sending a signal on the second output line to open the second switch prior to a hot-plug insertion or removal of the second interconnect device; and
sending a signal on the second output line to close the second switch after successful hot-plug insertion or removal of the second interconnect device.

9. The method of claim 7, further comprising:
electrically isolating both the first interconnect device and the second interconnect device from the interconnect bus segment.

10. The method of claim 9,
the step of connecting the interconnect sourcing device to the interconnect bus segment comprising the step of:
connecting a third output line of the interconnect sourcing device to a third switch electrically interposed between the interconnect bus segment and both the first interconnect device and the second interconnect device; and
the step of electrically isolating both the first interconnect device and the second interconnect device comprising the step of:

sending a signal on the third output line to open the third switch.

11. The method of claim 1, wherein the interconnect sourcing device is an interconnect bridge.

12. The method of claim 1, further comprising the steps of:
selectively terminating the bus segment between the interconnect sourcing device and the first interconnect device; and
selectively terminating the bus segment between the interconnect sourcing device and the second interconnect device.

13. The method of claim 1, further comprising the steps of:
selectively putting an I/O buffer of the first interconnect device into a low-power state; and
selectively putting an I/O buffer of the first interconnect device into a low-power state.

14. A computer interconnect bus system, comprising:
an interconnect sourcing device;
an interconnect bus segment coupled to the interconnect sourcing device, the interconnect bus segment implemented according to an interconnect bus protocol;
a first interconnect device, dynamically couplable to the interconnect bus segment, the first interconnect device dynamically coupled to the interconnect bus segment responsive to a first interconnect transaction destined over the interconnect bus segment to the first interconnect device and dynamically isolated from the interconnect bus segment responsive to a second interconnect transaction destined over the interconnect bus segment to the second interconnect device; and
a second interconnect device dynamically couplable to the interconnect bus segment, the second interconnect device dynamically coupled to the interconnect bus segment responsive to the second interconnect transaction and dynamically isolated from the interconnect bus segment responsive to the first interconnect transaction.

15. The computer interconnect bus system of claim 14, wherein the first interconnect device and the second interconnect device are prohibited from being simultaneously electrically connected to the interconnect bus according to the interconnect bus protocol.

16. The computer interconnect bus system of claim 14, further comprising:
a first switch, electrically interposed between the interconnect bus segment and the first interconnect device, the first switch having an open position and a closed position, the first interconnect device being electrically connected to the interconnect bus segment when the first switch is in the closed position, the first interconnect device being electrically isolated from the interconnect bus segment when the first switch is in the open position, the first switch controlled by the interconnect sourcing device; and
a second switch, electrically interposed between the interconnect bus segment and the second interconnect device, the second switch having an open position and a closed position, the second interconnect device being electrically connected to the interconnect bus segment when the second switch is in the closed position, the second interconnect device being electrically isolated from the interconnect bus segment when the second switch is in the open position, the second switch controlled by the interconnect sourcing device.

17. The computer interconnect bus system of claim 16, the interconnect sourcing device comprising:
a first output line, coupled to the first switch, the first switch closing responsive to a close signal on the first output line and the first switch opening responsive to an open signal on the first output line; and
a second output line, coupled to the second switch, the second switch closing responsive to a close signal on the second output line and the second switch opening responsive to an open signal on the second output line.

18. The computer interconnect bus system of claim 16, wherein the interconnect bus segment has a plurality of signal lines, and
the first interconnect device further comprising:
a first plurality of connectors, corresponding to each of the plurality of signal lines;
the second interconnect device further comprising:
a second plurality of connectors, corresponding to each of the plurality of signal lines;
the first switch comprising:
a plurality of first switches, each of the plurality of first switches electrically connecting and electrically isolating one of the plurality of signal lines from one of the first plurality of connectors; and
the second switch comprising:
a plurality of second switches, each of the plurality of second switches electrically connecting and electrically isolating one of the plurality of signal lines from one of the second plurality of connectors.

19. The computer interconnect bus system of claim 16, wherein the first switch and the second switch are packaged as unit.

20. The computer interconnect bus system of claim 16, further comprising:
a third switch, electrically interposed between the interconnect bus segment and the first switch and electrically interposed between the interconnect bus segment and the second switch, the first switch and the second switch being electrically connected to the interconnect bus segment when the third switch is in the closed position, the first switch and the second switch being electrically isolated from the interconnect bus segment when the third switch is in the open position, the third switch controlled by the interconnect sourcing device.

21. The computer interconnect bus system of claim 17, the interconnect sourcing device further comprising:
firmware adapted to send a close signal on the first output line responsive to an interconnect transaction destined for the first interconnect device;
firmware adapted to send an open signal on the first output line responsive to an interconnect transaction destined for the second interconnect device;
firmware adapted to send a close signal on the second output line responsive to an interconnect transaction destined for the second interconnect device; and
firmware adapted to send an open signal on the second output line responsive to an interconnect transaction destined for the first interconnect device.

22. The computer interconnect bus system of claim 16, wherein the first interconnect device and the second interconnect device are adapted for hot-plug insertion and hot-plug removal.

23. The computer interconnect bus system of claim 22, wherein the interconnect sourcing device is adapted to open the first switch prior to hot-plug removal or hot-plug insertion of the first interconnect device;

wherein the interconnect sourcing device is adapted to open the second switch prior to hot-plug removal or hot-plug insertion of the second interconnect device, wherein the interconnect sourcing device is adapted to close the first switch alter hot-plug removal or hot-plug insertion of the first interconnect device, wherein the interconnect sourcing device is adapted to close the second switch alter hot-plug removal or hot-plug insertion of the second interconnect device.

24. The computer interconnect bus system of claim 14, wherein the interconnect bus protocol is the Peripheral Component Interconnect protocol.

25. The computer interconnect bus system of claim 14, further comprising:
   termination logic to selectively terminate the interconnect bus segment between the interconnect sourcing device and the first interconnect device; and
   termination logic to selectively terminate the interconnect bus segment between the interconnect sourcing device and the second interconnect device.

26. The computer interconnect bus system of claim 14, the first interconnect device further comprising:
   I/O buffer logic to selectively place an interconnect bus I/O buffer of the first interconnect device in a low power state; and
   the second interconnect device further comprising:
   I/O buffer logic to selectively place an interconnect bus I/O buffer of the second interconnect device in a low power state.

27. The computer interconnect bus system of claim 14, further comprising:
   termination logic to detect a first predetermined signal on an unterminated signal line of the interconnect bus segment and to selectively enter a low power state on terminated lines of the interconnect bus segment;
   termination logic to detect a second predetermined signal on an unterminated signal line of the interconnect bus segment and to selectively exit the low power state; and
   termination logic to send the first predetermined signal and the second predetermined signal.

28. An interconnect bus bridge, comprising:
   means for connecting the interconnect bridge to an interconnect bus segment, the interconnect bus segment implemented according to an interconnect bus protocol;
   means for dynamically coupling a first interconnect device to the interconnect bus segment responsive to a first interconnect transaction destined over the interconnect bus segment to the first interconnect device and for dynamically isolating the first interconnect device from the interconnect bus segment responsive to a second interconnect transaction destined over the interconnect bus segment to a second interconnect device; and
   means for dynamically coupling the second interconnect device to the interconnect bus segment responsive to the second interconnect transaction and for dynamically isolating the second interconnect device from the interconnect bus segment responsive to the first interconnect.

29. The interconnect bridge of claim 28,
   the means for dynamically coupling the first interconnect device comprising:
   means for signaling a first switching means, the first switching means interposed between the interconnect bridge and the first interconnect device, the first switching means adapted to electrically couple and to electrically isolate the first interconnect device; and
   the means for dynamically coupling the second interconnect device comprising:
   means for signaling a second switching means, the second switching means interposed between the interconnect bridge and the second interconnect device, the second switching means adapted to electrically couple and to electrically isolate the second interconnect device.

30. The interconnect bridge of claim 28, further comprising:
   means for simultaneously dynamically isolating both the first interconnect device and the second interconnect device from the interconnect bus segment.

31. The interconnect bridge of claim 28 further comprising:
   means for selectively terminating the interconnect bus segment between the first interconnect device and the interconnect bridge; and
   means for selectively terminating the interconnect bus segment between the second interconnect device and the interconnect bridge.

32. The interconnect bridge of claim 28, further comprising:
   means for selectively placing an I/O buffer of the first interconnect device in a low power state; and
   means for selectively placing an I/O buffer of the second interconnect device in a low power state.

33. The method of claim 1, further comprising:
   the interconnect sourcing device determining whether the interconnect transaction is destined for the one interconnect device over the interconnect bus segment;
   in response to determining that the interconnect transaction is destined for the one interconnect device, the interconnect sourcing device activating control signaling to cause electrical connection of the one interconnect device to the interconnect bus segment, and to cause electrical isolation of the other interconnect device from the interconnect bus segment.

34. The method of claim 1, wherein the interconnect transaction comprises a bus transaction destined over the interconnect bus segment to the first interconnect device, and the interconnect sourcing device comprises an interconnect bridge, the method further comprising:
   the interconnect bridge decoding the bus transaction to determine whether the bus transaction is destined over the interconnect bus segment to the first interconnect device;
   in response to determining that the bus transaction is destined over the interconnect bus segment to the first interconnect device, the interconnect bridge activating control signaling to cause electrical connection of the first interconnect device to the interconnect bus segment, and to cause electrical isolation of the second interconnect device from the interconnect bus segment.

35. The method of claim 1, wherein the electrical connecting and isolating acts enable provision of a point-to-point interconnect bus between the interconnect sourcing device and each of the first and second interconnect devices.

36. The method of claim 8, wherein configuring the interconnect sourcing device for hot-plug insertion and removal of the first and second interconnect devices is separate from the electrical connecting and electrical isolating acts responsive to the interconnect transaction.

37. The computer interconnect bus system of claim 14, wherein the interconnect sourcing device is adapted to determine whether an interconnect transaction is destined over the interconnect bus segment to the first interconnect device or second interconnect device, in response to determining that the interconnect transaction is destined over the interconnect bus segment to the first interconnect device, the interconnect sourcing device being adapted to activate control signaling to cause electrical connection of the first interconnect device to the interconnect bus segment, and to cause electrical isolation of the second interconnect device from the interconnect bus segment.

38. The computer interconnect bus system of claim 37, wherein, in response to determining that the interconnect transaction is destined for the second interconnect device, the interconnect sourcing device being adapted to activate control signaling to cause electrical connection of the second interconnect device to the interconnect bus segment, and to cause electrical isolation of the first interconnect device from the interconnect bus segment.

39. The computer interconnect bus system of claim 14, wherein the dynamic coupling of the first and second interconnect devices to the interconnect bus segment responsive to whether an interconnect transaction is destined over the interconnect bus segment to the first interconnect device or second interconnect device enables provision of a point-to-point interconnect bus between the interconnect sourcing device and each of the first and second interconnect devices.

40. The computer interconnect bus system of claim 14, wherein the dynamic coupling of the first and second bus devices to the interconnect bus segment responsive to the first or second interconnect transaction is separate from an operation involving hot insertion and removal of the first or second interconnect device.

* * * * *

UNITED STATES PATENT AND TRADEMARK OFFICE
CERTIFICATE OF CORRECTION

PATENT NO. : 7,099,966 B2  Page 1 of 1
APPLICATION NO. : 10/184164
DATED : August 29, 2006
INVENTOR(S) : Michael Y. Chan et al.

It is certified that error appears in the above-identified patent and that said Letters Patent is hereby corrected as shown below:

In column 12, line 67, in Claim 23, after "device" delete ";" and insert -- , --, therefor, In column 13, line 5, in Claim 23, after "switch" delete "alter" and insert -- after --, therefor.

In column 13, line 8, in Claim 23, after "switch" delete "alter" and insert -- after --, therefor.

Signed and Sealed this

Thirtieth Day of June, 2009

JOHN DOLL
*Acting Director of the United States Patent and Trademark Office*